March 8, 1927.
P. ROHDE
1,620,395
ALTERNATING CURRENT COMMUTATOR MOTOR
Filed Oct. 17, 1925
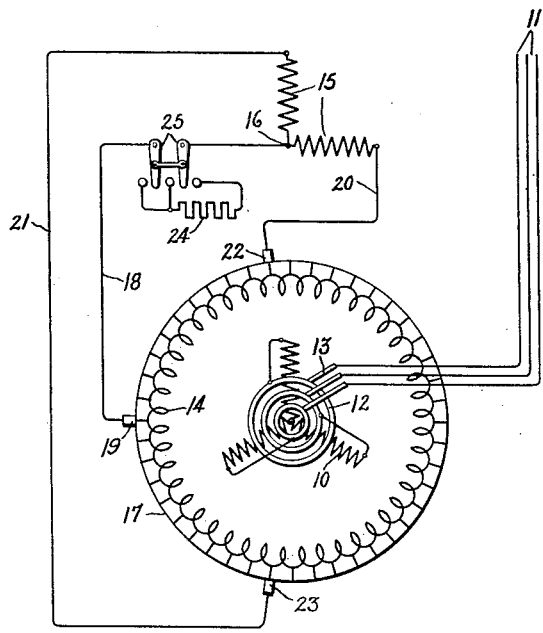
Inventor:
Paul Rohde;
by
His Attorney.

Patented Mar. 8, 1927.

1,620,395

UNITED STATES PATENT OFFICE.

PAUL ROHDE, OF BERLIN, GERMANY, ASSIGNOR TO GENERAL ELECTRIC COMPANY, A CORPORATION OF NEW YORK.

ALTERNATING-CURRENT COMMUTATOR MOTOR.

Application filed October 17, 1925, Serial No. 62,988, and in Germany December 19, 1924.

My invention relates to variable speed alternating current commutator motors, and its object is to reduce the number of commutator brushes necessary to obtain proper speed and power factor regulation.

The type of motor to which my invention relates comprises a primary member having a polyphase primary winding and a commutator. The commutator is either directly connected to the primary winding or is connected to an auxiliary winding inductively associated with the primary winding such that a commutator voltage is obtainable for regulating purposes which is proportional to the primary voltage. For practicable purposes this primary member should constitute the rotor element of the machine. The secondary element, which is then made the stator element, carries a polyphase secondary winding which is connected through suitable brushes and leads to the commutator. In order that the power factor and speed of such a motor may be regulated by shifting the brushes it is essential that the voltage and phase of the current which is injected into the secondary from the commutator be controlled individually in the various phases of the secondary winding.

The desired result may be accomplished as described in Schrage Patent Reissue No. 14,031 by separating the phases on the secondary and individually connecting their ends to the commutator through suitable leads and brushes. Thus in a three-phase motor six sets of brushes per pair of poles would be required. I have discovered that the number of brush leads and brush sets may be reduced without destroying the individuality of the secondary phase circuits by providing the secondary with a two phase winding and connecting a single brush lead to the common neutral point of the winding, the outer ends of the two phases being provided with individual brush leads. In this way the number of brush leads and brush sets per pair of poles is reduced to three. By neutral point or points as used herein I mean to imply that the two phases of the two-phase winding are interconnected at one end, the neutral point or points being the interconnection.

The features of my invention which are believed to be novel and patentable will be pointed out in the claims appended hereto. For a better understanding of the invention reference is made in the following description to the accompanying illustration of the invention.

The single figure of the accompanying drawing is a diagrammatic view of an alternating current commutator motor with its attendant supply and control circuits constructed in accordance with my invention.

In the embodiment shown the rotor comprises a polyphase primary winding 10, connected to a source of supply 11 through slip rings 12 and brushes 13, and a commutated winding 14 inductively related to the primary winding 10. These two windings may be placed in the same or adjacent slots with the relative number of turns to give the desired commutator voltage.

The secondary stator winding is represented at 15 and comprises two coils or groups of coils arranged in the well known two phase or quarter phase relation with a common neutral point 16. The neutral point is connected to the commutator 17 through lead 18 and brush 19. The outer ends of the two phases of winding 15 are individually connected to the commutator by leads 20 and 21 and brushes 22 and 23. For starting purposes the single resistance 24 may be inserted in lead 18, and thereafter cut out by the switch 25.

The voltage injected into the secondary from the commutator and the speed of the machine will vary with the displacement of the outer brushes 22 and 23 from brush 19. If all three brushes are moved to the same commutator segment the secondary will be short circuited and will operate as an ordinary induction motor. If the brushes 22 and 23 are interchanged in position the speed will be varied through synchronism.

For any given speed and load it will be evident that the power factor may be varied by keeping substantially the same relative displacement of the brushes but shifting them all in the same direction about the commutator. If the speed and load range is small brush 19 may be fixed in that position which gives the best compromise power factor for the average speed and load. Even when brush 19 is fixed the power factor may be adjusted by a slight unbalancing of the secondary current as by shifting the two outer brushes in the same direction about the commutator. This arrangement reduces the number of brush leads and brush sets and permits a greater spacing between brushes for a given size of commutator.

In accordance with the provisions of the patent statutes, I have described the principle of operation of my invention, together with the apparatus which I now consider to represent the best embodiment thereof; but I desire to have it understood that the apparatus shown and described is only illustrative and that the invention may be carried out by other means.

What I claim as new and desire to secure by Letters Patent of the United States, is:—

1. An alternating current motor comprising relatively rotatable primary and secondary members, the primary member having a polyphase winding connected to a commutator and the secondary having a two phase winding with the neutral points interconnected, a brush on said commutator connected to said neutral point, and movable brushes on said commutator individually connected to the outer ends of said two phase winding.

2. An alternating current motor comprising a rotor member and a stator member, a polyphase primary winding on said rotor member, a winding inductively related to the primary winding on said rotor member and connected to a commutator, a two phase secondary winding on said stator member, having the neutral points interconnected, three sets of relatively movable brushes on said commutator, one set being connected to the neutral point of said secondary winding and the other sets being respectively connected to the outer terminals of said secondary winding.

3. An alternating current motor comprising a three phase rotor primary member and a two phase stator secondary member, a regulating winding connected to a commutator on said primary member, a brush set on said commutator connected to a neutral point of said two phase winding, a starting resistance, means for including said resistance between said brush set and neutral point and two other brush sets on said commutator, relatively movable with respect to said first mentioned brush set and to each other, respectively connected to the outer terminals of said two phase winding.

In witness whereof, I have hereunto set my hand this 18th day of September, 1925.

PAUL ROHDE.